Sept. 20, 1971                J. A. PETRIE ET AL                3,606,349
                    SEAL WITH PRESSURE RESPONSIVE TOLERANCE CONTROL
Filed Sept. 16, 1969                                          2 Sheets-Sheet 1

INVENTOR
JAMES A. PETRIE
WILLIE WILLIAMSON
THOMAS STEEL
JAMES I. HAMMOND
BY
Cushman, Darby & Cushman
Attorneys

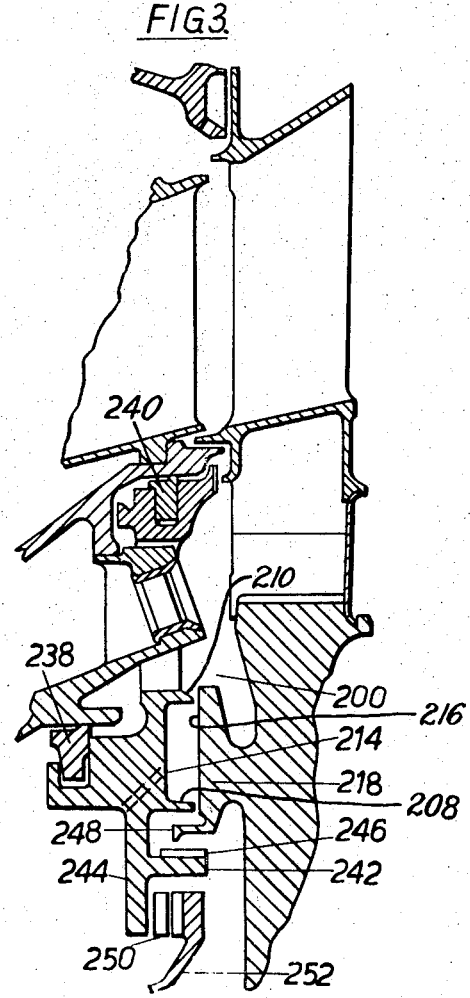

United States Patent Office
3,606,349
Patented Sept. 20, 1971

3,606,349
SEAL WITH PRESSURE RESPONSIVE
TOLERANCE CONTROL
James A. Petrie, Littleover, Willie Williamson, Shelton
Lock, Thomas Steel, Littleover, and James I. Hammond, West Heath, Birmingham, England, assignors
to Rolls Royce Limited, Derby, England
Filed Sept. 16, 1969, Ser. No. 858,325
Claims priority, application Great Britain, Aug. 7, 1969,
39,609/69
Int. Cl. F16j 15/16
U.S. Cl. 277—27                           3 Claims

ABSTRACT OF THE DISCLOSURE

A sealing device mounted for axial movement on a stationary portion of a gas turbine engine and arranged to seal against the upstream face of the high pressure turbine of the engine. The sealing device is annular in form and has two lips defining an annular channel and a number of radial lands extending between the lips thereby defining a plurality of equi-spaced recesses. In operation, the recesses in combination with the turbine disc form a number of chambers which are subjected to a variable pressure, the chambers being in communication with a source of high pressure gas. If the clearance between the sealing device and the turbine disc decreases the pressure in the chambers increases and vice-versa, the resultant pressure on the sealing device acting to maintain the clearance at a substantially constant value. The sealing device may also include an axial sealing element which co-operates with a sealing element provided on the turbine disc so that the pressure loss in the chamber when the clearance is large is restricted.

---

This invention relates to a sealing device located between two relatively rotatable structures.

Considerable losses in performance and specific fuel consumption occur in rotating machinery such as the turbine of a gas turbine engine due to leakage at the turbine. A clearance between the turbine and a seal which is fixed to a stationary part of the engine has to be provided in order to allow for possible mis-alignment, thermal distortion and manufacturing tolerances and such a clearance is frequently larger then is desirable in order to meet these allowances.

The present invention provides a sealing device between two relatively movable structures in which the seal is axially movable relative to the structures and which helps to overcome the above disadvantages.

According to the present invention we provide a sealing device between two relatively rotatable structures including a seal part located between a relatively high pressure zone and a relatively low pressure zone the seal part being mounted on the first one of said structures and capable of axial movement relative to said structures, the seal part in combination with the second one of said structures forming at least one chamber subjected to a variable pressure, the chamber being in communication with the high pressure zone, the arrangement being such that as the clearance between the seal part and the second structure decreases the pressure in the chamber rises and vice-versa, the resultant pressure acting on the seal part varying to maintain the clearance at a substantially constant value.

Preferably the seal part has two circular lips which between them define an annular chamber. The inner lip may be provided with apertures for the flow of high pressure air into the chamber which may be sub-divided into a number of equi-spaced sub-chambers. The seal part may have a number of pairs of radial projections which engage on each side of blocks provided on a stationary member and the contact surfaces on the projections and blocks may be formed of silicon-nitride material. A sealing ring may be provided between an inner face of the seal part and a stationary circular support surface. The sealing ring may be of silicon-nitride material and may be formed in a number of arcuate portions. Stops may be provided to limit the axial movement of the seal part. The first structure may include the swirl nozzle supports of a gas turbine and the second structure may be the high pressure turbine of a gas turbine engine. The seal part may be arranged to seal against the upstream face of the disc of the high pressure turbine.

Figure 1:
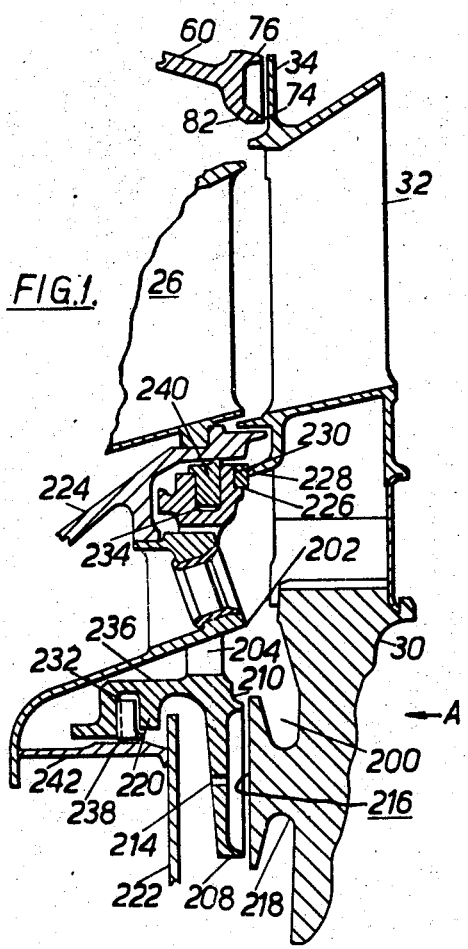
Figure 2:
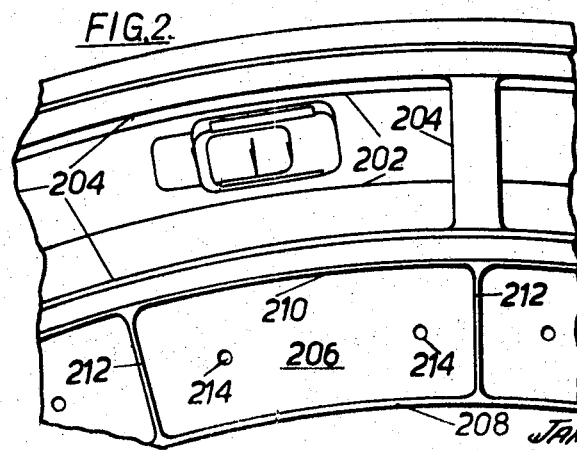

FIG. 1 is a side elevation of a portion of a gas turbine engine showing in detail one form of sealing device according to the present invention, FIG. 2 shows a view on arrow A in FIG. 1, omitting the turbine and FIG. 3 shows a modified form of the sealing device shown in FIGS. 1 and 2.

Referring to the drawings, a high pressure turbine 30 having a plurality of equi-spaced blades 32 is positioned downstream of a ring of nozzle guide vanes only one of which, 26 is shown. Each blade 32 has a shroud 34 against which a sealing device 60 only a part of which is shown is arranged to seal. The sealing device which is described in our co-pending U.K. patent application No. 45,753/68 is similar to the sealing device of the present invention and includes inner and outer lips 74 and 76 respectively and apertures 82 which correspond to similar features of the present invention which will now be described.

An inner sealing part 200 of annular form is located on swirl nozzle carrier pockets 202 which extend through and engage with the sides of slots 204 provided in the sealing part 200. The swirler nozzles mounted in the carrier pockets 202 enable a flow of relatively cool air bled from the compressor to be supplied to the turbine blades for cooling purposes.

The inboard downstream portion of the sealing part 200 is formed as a number of arcuate pockets 206 which are defined by inner and outer radial lips 208, 210 respectively and radial lands 212.

Each pocket has two apertures 214 drilled in its rear face which are analogous to the apertures 82 in the outer sealing part 60. The lips and lands form a seal in combination with a flat face 216 of a projection 218 formed integrally with the turbine disc 30.

Under normal running conditions the resultant force on the sealing part maintains the clearance at a constant pre-determined value and the pressure in the chambers 206 between the lips 208, 210 remains substantially constant. If the clearance should decrease the pressure in the chambers will rise and the resultant force will cause the sealing part to move to the left, the pressure in the chambers will drop and the sealing part will be balanced in the position to give the required clearance and the converse will happen if the clearance increases. If, in an extreme case the sealing lips close completely against the radial shroud, the pressure will build up in the chambers by means of gas flowing into the chambers through the holes 214, to a value equal to the pressure upstream of the sealing part and the sealing part will lift off the shroud, the pressure in the chambers will stabilize and the desired clearance will be maintained.

The downstream movement of the sealing part is limited by contact between a flange 220 and a stop plate 222 and upstream movement is limited by contact between the rim of the sealing part and the support ring 224.

The operation of the sealing part 200 maintains a ring 226 at a fixed clearance from a projection 228 formed on the turbine blades 32, the ring 226 being fixed in shoulder 230 machined in the rim of the sealing part. The ring 226 is of a wear away nature in case of contact with the projection 228 due to possible steps in the projection because of variations in the blades 32.

Slots 232 and 234 are formed in flange 236 and the rim of sealing part 200 respectively and retain sealing rings 238 and 240 respectively. Ring 238 slides against extension 242 and ring 240 against a machined diameter under the outer lip of support ring 224, thus sealing off the annular space between lip 210 and ring 226 of seal part 200.

Referring now to FIG. 3, the seal part 200 has been modified to include as axial flange 242 and a radial flange 244. The flange 242 carries a sealing element 246 which is arranged to co-operate with a sealing element 248 attached to the projection 218. The sealing elements 246 and 248 provide a restriction when the axial clearance between lips 208 and 210 and face 216 become large during engine starting and other transient conditions. The flange 244 can abut a spring ring 250 which is secured to a fixed part 252 of the engine structure to limit the downstream movement of the seal part 200.

We claim:
1. A sealing device located between a stationary portion and high pressure turbine of a gas turbine engine including a seal part located between relatively low pressure zone, the seal part being mounted for axial movement on the stationary portion of the engine and arranged to seal against a portion of the upstream face of the high pressure turbine disc, the seal part having a number of equi-spaced recesses arranged on a circular path, the recesses in combination with the disc forming a number of chambers subjected to a variable pressure, the chambers being in communication with the high pressure zone, the arrangement being such that as the clearance between the seal part and the disc decreases the pressure in the chambers rise and vice-versa, the resultant pressure acting on the seal part varying as the clearance varies to maintain the clearance at a substantially constant value.

2. A sealing device according to claim 1 in which an axial seal is provided between the seal part and the disc and comprises a sealing element mounted on both the seal part and the disc, the sealing elements being mounted radially inwardly of the recesses.

3. A sealing device according to claim 2 in which the seal part can abut a spring loaded stop mounted on a stationary portion of the engine.

References Cited
UNITED STATES PATENTS

| | | | |
|---|---|---|---|
| 3,347,553 | 10/1967 | Schweiger | 277—27 |
| 3,501,245 | 3/1970 | Ivanko | 415—113 |

ROBERT I. SMITH, Primary Examiner

U.S. Cl. X.R.
277—57; 415—170